UNITED STATES PATENT OFFICE.

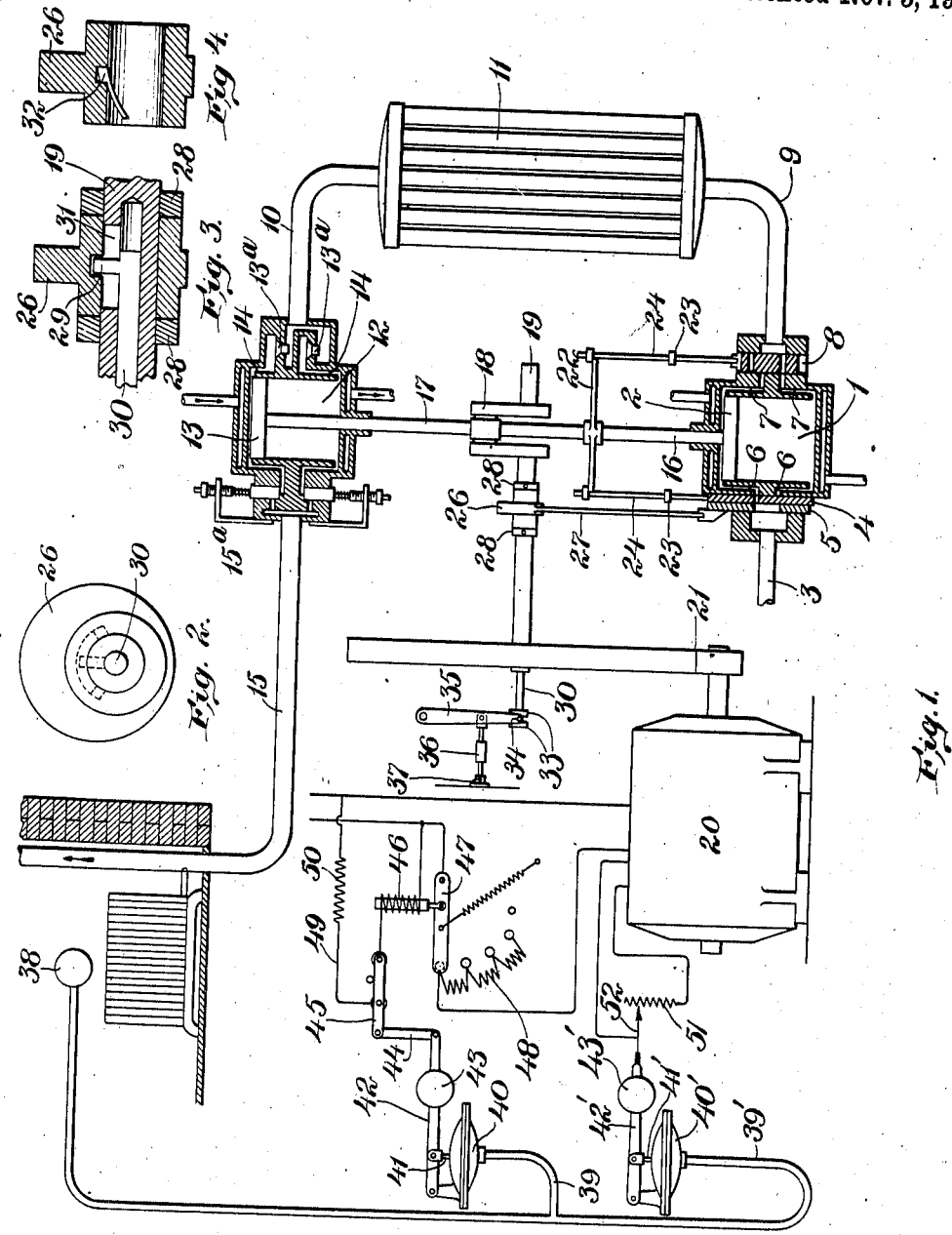

NATHANIEL B. WALES, OF BRAINTREE, MASSACHUSETTS, ASSIGNOR TO GUY B. COLLIER, OF KINDERHOOK, NEW YORK.

HEATING APPARATUS.

1,043,553.  Specification of Letters Patent.  Patented Nov. 5, 1912.

Application filed January 4, 1907. Serial No. 350,738.

*To all whom it may concern:*

Be it known that I, NATHANIEL B. WALES, citizen of the United States, and resident of Braintree, county of Norfolk, Massachusetts, have invented certain new and useful Improvements in Heating Apparatus, of which the following is a specification.

This invention relates to a heating apparatus in which the heat conveying or circulating medium is an elastic fluid and in which the temperature of the fluid is raised to the degree required by first expanding the fluid and then compressing it, heat being supplied to the fluid between its admission into the expanding mechanism and its admission into the compressing mechanism so that the heating of the fluid is effected by doing a comparatively small amount of work thereon. In a heating system of this character the expanding and compressing mechanisms are driven by a prime motor and it is the object of the present invention to so control the operation of the apparatus that a substantially constant temperature within the system or at the place of use of the heat contained in the fluid delivered from the compressing mechanism may be automatically maintained with a minimum expenditure of motive power by the motor.

The features of invention may be embodied in systems in which the air or other heat conveying fluid is delivered from the compressing mechanism at substantially atmospheric pressure and delivered directly into the rooms or spaces to be heated or in systems in which the air is delivered by the compressing mechanism at a pressure above the pressure of the atmosphere and is circulated through radiators or heating devices and the latter systems may be either open or closed systems.

For the purpose of illustration I have shown diagrammatically in the accompanying drawings an arrangement of apparatus embodying the features of my invention.

The various features of my invention will be readily understood from the following detailed description of this apparatus and will be more particularly set forth in the claims.

In these drawings—Figure 1 is a diagrammatic view showing a heating system constructed and controlled in accordance with my invention. Figs. 2, 3 and 4 are details of devices for varying the amount of compression effected in the apparatus to satisfy the conditions under which it is being run.

In practising my invention as shown in the drawings the expanding and compressing mechanisms are driven by an electric motor and the operation of the apparatus may be controlled to maintain a substantially constant temperature at a given point by means of a thermostat located at that point and so controlling a starting and stopping mechanism for the motor that the apparatus is thrown into operation when the temperature at the thermostat falls below a predetermined point and is thrown out of operation when the temperature at the thermostat rises above a predetermined point. The operation of the apparatus may also be controlled by a thermostat which may be but is not necessarily the same thermostat which controls the starting and stopping mechanism and which so controls a speed changing mechanism that the speed of the expanding and compressing mechanism will increase if the temperature at the thermostat falls below a predetermined point and will decrease as the temperature rises toward that point. Either of these means for controlling the operation of the apparatus may be employed as best suits the conditions under which the apparatus is to be used or both means may be embodied in the same apparatus. One form of apparatus embodying both forms of controlling means is illustrated in the drawings.

In the apparatus shown in the drawings the expanding mechanism is in the form of a cylinder 1 within which a piston 2 reciprocates and to which the air is supplied through a pipe 3. The supply of air to the opposite sides of the piston is controlled by a main valve 4 and a cut-off valve 5 which are operated to open and close the supply ports 6 at proper intervals. The valves are so constructed and operated that during the travel of the piston in either direction air will be taken in back of the piston for a portion of its stroke and then the cut-off valve will be operated to cut off the supply of air so that during the remainder of the stroke the air back of the piston will expand. During this stroke of the piston the air in front of the piston which has been expanded during the stroke in the opposite direction, will be delivered through one of the delivery ports 7 which remains open during the entire stroke of the piston. The delivery ports 7 are opened and closed at proper intervals by a valve 8.

The cylinder 1 may be jacketed as indicated in the drawings and a heating agent may be circulated through the jacket so that the air in expanding will absorb heat and be delivered from the expanding mechanism at a temperature above that at which it would otherwise have been delivered. The expanded air is conducted from the expanding cylinder 1 to a compressing mechanism through pipes 9 and 10 and an interposed series of pipes 11. During its passage from the expanding to the compressing mechanism heat is supplied to the air and for this purpose the bank of pipes 11 may be arranged where the temperature of the surrounding air is higher than the temperature of the expanded air. In case the temperature of the air as it comes from the expanding mechanism is below the temperature of the atmosphere, heat may be supplied to the air from the atmosphere as it passes through the bank of pipes. Under some conditions it may be found desirable and economical to surround the pipes 11 with a heating agent such as exhaust products of combustion or other waste products containing heat.

The compressing mechanism illustrated consists of a cylinder 12 within which a piston 13 reciprocates. The supply of air from the pipe 10 to the cylinder 12 is controlled through valves 13ª and ports 14. During the movement of the piston 13 in one direction air from the pipe 10 enters the cylinder back of the piston during its entire stroke. When the piston moves in the opposite direction the valve 13ª for that end of the piston closes and the air in front of the piston is compressed until the pressure in front of the piston is sufficient to open the delivery valve 15ª for that end of the cylinder when the compressed air is delivered through this valve into the pipe 15 by which it is conducted to the place where it is to be used for heating purposes. The compression cylinder may be jacketed if found desirable and a heating agent circulated through this jacket from which heat may be absorbed by the compressed air.

The pistons 2 and 13 are connected by piston rods 16 and 17 with the same crank 18 in such manner that the expanding stroke of the piston 2 occurs during the compression stroke of the piston 13. This reduces the power required for operating the mechanism since the expansion of the air in the expanding mechanism tends to drive the piston of the compressing mechanism during its compression stroke. The crank 18 is connected with a driving shaft 19 and the compressing and expanding mechanisms are driven by an electric motor 20 connected with the driving shaft 19 through suitable gearing indicated at 21.

In order that the apparatus may be regulated or adjusted to vary the amount of compression to suit the varying conditions under which the apparatus may be used, means are provided for regulating the cutting off of the supply of air to the expansion cylinder. By this means the amount of expansion is varied and consequently the amount of compression required in the compressing mechanism to compress the air to a given pressure. The temperature range through which the air is raised therefore may be varied in accordance with the temperature conditions of the atmosphere at the time of use and according to the temperature to which it is desired to raise the air in the apparatus.

The devices indicated in the drawings for operating the valves and varying the cut off are as follows: The main supply valve 4 as well as the exhaust valve 8 of the expansion cylinder, are shifted at each end of the stroke of the piston 2 by means of tappet arms 22 secured to the piston rod 16 and arranged to alternately engage collars 23 secured to the valve rods 24. The cut-off valve 5 is operated by an eccentric 26 connected with the valve by an eccentric strip and rod 27. The eccentric is loosely mounted on the crank shaft 19 between collars 28. The eccentric is connected to revolve with the shaft by means of a lug 29 formed on the end of a rod 30 which is mounted within the shaft 19. The lug projects radially through a slot 31 in the shaft and engages a spiral groove 32 formed in the bore of the eccentric. So long as the rod 30 remains in a fixed position longitudinally of the shaft the eccentric will remain in fixed relation to the shaft, thus operating the cut-off valve to cut off the supply of air to the expansion cylinder at a definite point in the stroke of the piston. If the rod 30 is shifted longitudinally of the shaft the lug 29 working in the spiral groove 32 will shift the eccentric about the shaft thus varying the point of cut off. The rod 30 projects beyond the end of the shaft 19 and is connected by means of collars 33 and pin 34 with one end of a lever 35. The lever 35 is connected by means of an adjustable link 36 with a fixed pivot 37 so that by adjusting the length of the link 36 the position of the rod 30 longitudinally of the shaft may be varied, thus varying the position of the eccentric and the cut-off of the expanding cylinder.

For the purpose of controlling the operation of the apparatus to maintain a substantially constant temperature, means are provided for starting and stopping the motor 20 which may be controlled by a thermostat located at the point where it is desired to maintain a substantially even temperature. In the construction shown the thermostat is indicated at 38 and is shown located within an apartment which is to be heated from the air passing through pipe 15, it being assumed that the apparatus is to be controlled to maintain a substantially constant temperature in the apartment. The thermostat is connected by means of a pipe 39 with a chamber within a casing 40 below the flexible diaphragm within the casing (not shown). The construction of the thermostat is such that the thermostat regulates the pressure acting against the diaphragm according to the temperature at the thermostat. The diaphragm is connected by a rod or piston 41 with a lever 42 which is mounted upon the casing 40 and is provided with an adjustable weight 43. The end of the lever 42 is connected by a link 44 with a switch 45 through the operation of which the starting and stopping of the motor 20 is effected. By adjusting the weight 43 on the arm 42 the pressure exerted upon the upper side of the diaphragm by the weight may be adjusted to balance the pressure on the under side of the diaphragm corresponding to any given temperature at the thermostat. So long as the temperature at the thermostat is such that the pressure below the diaphragm in the casing 40 is not sufficient to raise the weight 43 the switch 45 will remain closed and the apparatus will be operated by the motor 20 to heat the air supplied to the pipe D. When the temperature rises so that the pressure in the casing 40 raises the diaphragm and operates the lever 42 the switch 45 will be opened to cause the stopping of the motor and the operation of the apparatus will cease until the temperature again falls sufficiently to relieve the pressure in the casing 40 and allow the lever 42 to fall. The opening and closing of the switch may start and stop the motor through any suitable or well known starting and stopping mechanism. One form of such mechanism is indicated diagrammatically in the drawings. As here shown the closing of the switch 45 completes the circuit through the coil of a solenoid 46 which operates the arm 47 of a switch which completes the connection between the motor and the feed wires through a rheostat 48. The current is supplied to the circuit of the switch 45 from the feed wires of the motor through shunt wires 49 and resistance 50 connected with the pivot of the switch.

By controlling the operation of the apparatus in the manner above described the apparatus may be run to maintain a substantially constant temperature in the system or in the apartments to which heat is supplied with a comparatively small consumption of electricity or other motive agent for driving the electric motor or other motor as the case may be. In this case the apparatus is operated to expand and compress the air when a fresh supply of hot air is required to raise or maintain the temperature and as soon as the temperature is raised to the predetermined point the operation of the apparatus ceases and the air already supplied delivers its heat to maintain the temperature until there is sufficient drop in the temperature to again start the apparatus. Thus the air is expanded and compressed as required to maintain a substantially constant temperature with the expenditure of a comparatively small amount of power for operating purposes.

In addition to the controlling mechanism above described the apparatus may be provided with an adidtional controlling mechanism for varying the speed at which the compressing and expanding mechanisms are driven during the time that they are in operation. This speed controlling mechanism may be of any suitable construction and in case the apparatus is driven by an electric motor may be any well known means for varying the speed of an alternating or direct current motor. In the construction shown the means for changing the speed is indicated as a resistance 51 arranged in the circuit which excites the field magnets and which may be varied to vary the speed of the motor.

The devices for varying the resistance 51 in the magnet circuit and thus varying the speed of the motor and of the expanding and compressing mechanisms are similar in construction to the devices for controlling the opening and closing of the switch 45 and may be controlled from the same thermostat 38 as indicated in the drawings. As shown in the drawings a lever 42' is connected with a movable contact 52 so that the movement of the lever will vary the position of the contact and thus vary the resistance 51. The lever is provided with an adjustable weight 43' and is connected by a pin or piston 41' with a diaphragm within a casing 40' so that the lever is supported by the pressure exerted upon the under side of the diaphragm. The chamber formed in the casing below the diaphragm is connected by a pipe 39' with the thermostat 38 so that the pressure on the diaphragm depends upon the temperature at the thermostat. The weight 43' having been adjusted according to the temperature at which it is desired to vary the speed of the motor the lever 42' and contact 52 will be maintained in position so long as the temperature is above or equal to that for which the weight 43 is set. If the temperature falls below this point the lever 42' will swing downward thus varying the resistance 51 to cause the speeding up of the motor. This increase in speed of the motor will increase the speed at which the expanding and compressing mechanisms operate and supply a greater amount of hot air to the system thus tending to raise the temperature at the thermostat. So long as the temperature continues to fall the speed of the motor will continue to increase up to the maximum speed. As the temperature rises the lever 42' will be raised to increase the resistance 51 and thus slow down the motor until the temperature reaches a predetermined point corresponding to the adjustment of the weight 43' when the motor will continue to operate at a uniform speed. If the temperature continues to rise until it passes the temperature for which the weight 43 is set then the arm 42 will be operated to stop the motor.

The controlling mechanism for varying the speed of operation may be used either in combination with the mechanism for controlling the starting and stopping of the apparatus or may be used as the sole means for controlling the operation of the apparatus to maintain a substantially constant temperature. When used in combination with the mechanism for controlling the starting and stopping the speed controlling mechanism should be adjusted to operate at a lower temperature than the mechanism for controlling the starting and stopping so that the apparatus will be controlled by the starting and stopping mechanism so long as the temperature at the thermostat does not fall abnormally but will be speeded up above normal in case the temperature continues to fall.

It will be understood that the construction of the expanding and compressing mechanisms and of the various other devices and mechanisms shown in illustrating the apparatus are shown for the purpose of illustrating a system embodying the features of the invention and that these forms and arrangements are not essential and that the illustration is to a great extent diagrammatic.

Without attempting to point out in detail the various constructions and arrangements in which the features of my invention may be embodied, what I claim and desire to secure by Letters Patent is:—

1. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a starting and stopping mechanism, a speed changing mechanism, and devices for controlling said starting and stopping mechanism and speed changing mechanism by the temperature at a given point.

2. A heating apparatus comprising a fluid expanding mechanism, a fluid compressing mechanism, means for supplying heat to the fluid between its admission to the expanding mechanism and its admission to the compressing mechanism, a motor for driving the expanding and compressing mechanisms, a starting and stopping mechanism for the motor, a speed changing mechanism for the motor, and devices for controlling the starting and stopping mechanism and speed changing mechanism by the temperature at a given point.

In witness whereof, I have hereunto set my hand this 26th day of December 1906.

NATHANIEL B. WALES.

In the presence of—
  IRA L. FISH,
  KATHARINE A. DUGAN.